United States Patent
Kim et al.

(10) Patent No.: US 7,804,918 B2
(45) Date of Patent: Sep. 28, 2010

(54) APPARATUS FOR INDEPENDENTLY EXTRACTING STREAMS FROM HIERARCHICALLY-MODULATED SIGNAL AND PERFORMING SOFT-DECISION, AND METHOD THEREOF

(75) Inventors: Tae-Hoon Kim, Seoul (KR); Seung-Hyun Choi, Daejon (KR); Cheon-In Oh, Daejon (KR); Pan-Soo Kim, Daejon (KR); Dae-Ig Chang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1052 days.

(21) Appl. No.: 11/518,218

(22) Filed: Sep. 11, 2006

(65) Prior Publication Data
US 2007/0104294 A1 May 10, 2007

(30) Foreign Application Priority Data
Nov. 7, 2005 (KR) .................. 10-2005-0106042

(51) Int. Cl.
*H04L 27/00* (2006.01)

(52) U.S. Cl. ............... 375/324; 375/141; 375/150; 375/302; 375/308; 375/260; 375/296; 375/295; 375/316; 375/322

(58) Field of Classification Search .......... 375/324
See application file for complete search history.

(56) References Cited

U.S. PATENT DOCUMENTS

| 6,594,318 | B1 | 7/2003 | Sindhushayana | |
|---|---|---|---|---|
| 7,551,736 | B2 * | 6/2009 | Lee et al. ............ | 380/42 |
| 7,577,213 | B2 * | 8/2009 | Chen et al. ............ | 375/316 |
| 2008/0170640 | A1 * | 7/2008 | Gao et al. ............ | 375/302 |

FOREIGN PATENT DOCUMENTS

| EP | 0987869 | 3/2000 |
|---|---|---|
| EP | 1065854 | 1/2001 |
| WO | WO 95/16314 | 6/1995 |

OTHER PUBLICATIONS

Markarian et al.; "Hierarchical Modulation and DVB-S2"; XP009054470; pp. 138-146.
European Search Report for EP 06120190.
Chen et al.; "DVB-S2 backward-compatible modes: a bridge between the present and the future"; International Journal of Satellite Communications and Networking; 2004: pp. 341-365.

* cited by examiner

*Primary Examiner*—Shuwang Liu
*Assistant Examiner*—Dhaval Patel
(74) *Attorney, Agent, or Firm*—Lowe Hauptman Ham & Berner LLP

(57) ABSTRACT

An apparatus for independently extracting streams from a hierarchically-modulated signal and performing a soft-decision, and a method thereof are provided. The apparatus includes: a synchronizing unit for receiving a hierarchically-modulated signal configured of an I-channel signal and a Q-channel signal from an external device and performing a synchronizing process on the received signal; a divaricating unit 410 for divaricating the synchronized signal configured of the I-channel signal and the Q-channel signal from the synchronizing unit; a high priority (HP) stream extracting and soft-decision unit for extracting a HP stream from one of the divaricated signals, and performing a soft-decision; a processing unit for processing the other of the divaricated signals to allow constellation points to be distinguished; and a low priority (LP) stream extracting and soft-decision unit for extracting a LP stream from the processed signal from the processing unit and performing a soft-decision.

5 Claims, 3 Drawing Sheets

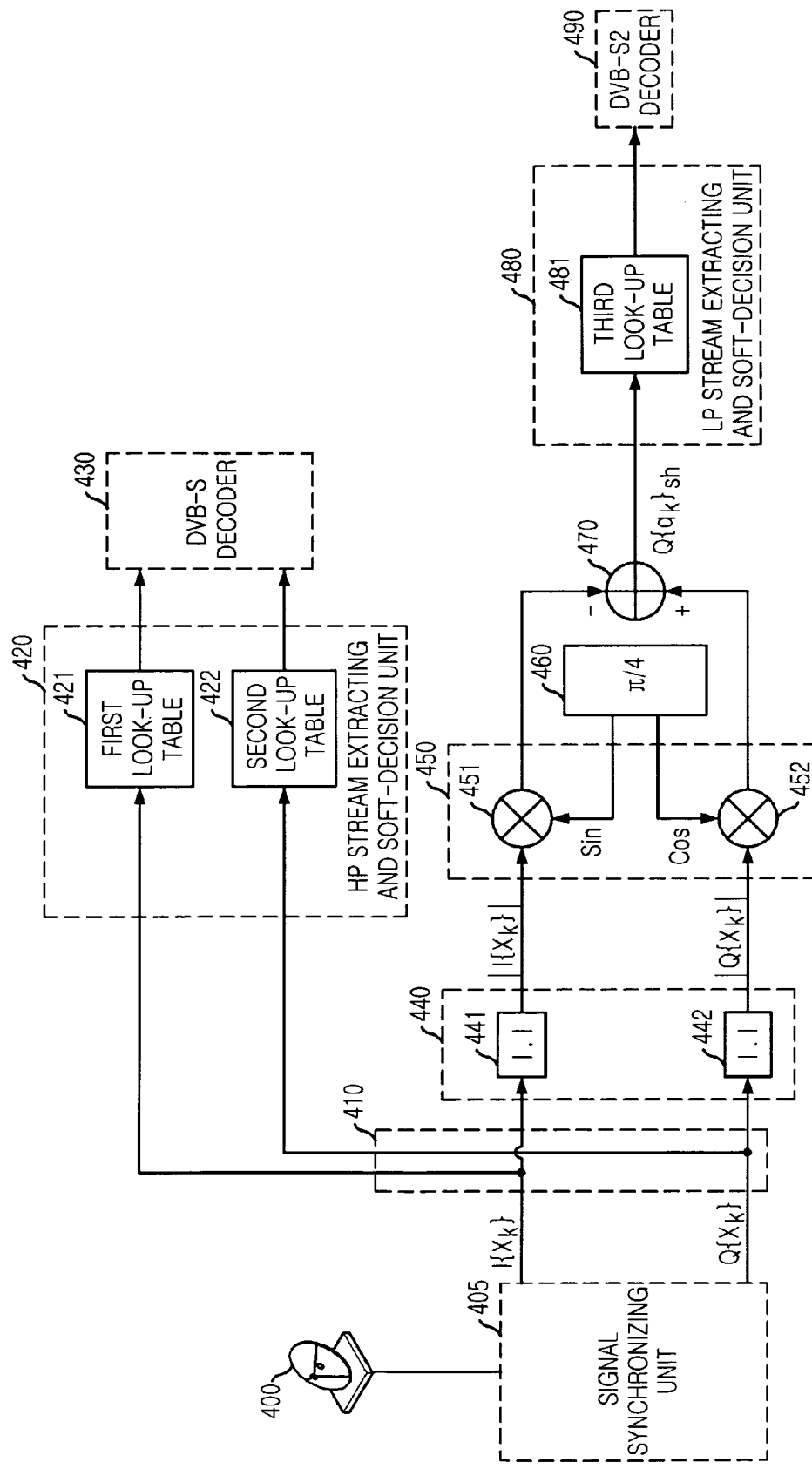

APPARATUS FOR INDEPENDENTLY EXTRACTING STREAMS FROM HIERARCHICALLY-MODULATED SIGNAL AND PERFORMING SOFT-DECISION, AND METHOD THEREOF

FIELD OF THE INVENTION

The present invention relates to an apparatus for independently extracting two streams from hierarchically-modulated signal, performing a soft-decision and outputting the two streams to corresponding decoders, and a method thereof; and, more particularly, to an apparatus for divaricating a receiving signal configured of an I-channel signal and a Q-channel signal, independently extracting a high priority (HP) stream and a low priority (LP) stream from the divaricated signals, performing the soft-decision, and outputting each of the extracted stream to a proper decoder, and a method thereof.

DESCRIPTION OF RELATED ARTS

Hereinafter, a backward compatible (BC) mode signal in a digital video broadcasting via satellite version 2 (DVB-S2) standard is used as an example of a hierarchically-modulated signal to describe the present invention. However, it is obvious to those skilled in the art that the present invention is not limited by the BC mode signal in DVB-S2 standard.

In order to transmit a digital signal, the digital signal must be modulated. That is, at least one of phase, amplitude and frequency of a carrier wave or combination thereof are transformed to a digital data 0 or 1 by a digital modulation scheme. A phase shift keying (PSK) modulation is one of widely known digital modulation schemes. In the PSK modulation scheme, the phase variation is mapped to a predetermined sign to transmit the digital signal.

A binary phase shift keying (BPSK) modulation scheme is also one of well known digital modulation schemes. In the BPSK, two values of digital signal are mapped to two phases, 0 and $\pi$, of the carrier wave to transmit the digital signal.

Differently from the BPSK, a quadrature phase shift keying (QPSK) modulation scheme combines two bits of two values of digital signal 0 and 1 and maps the combined bits to four phases of a carrier wave to transmit the digital signal. That is, two digital values (0,0) is mapped to a phase 0, two digital values (0,1) is mapped to a phase .pi./2, two digital values (1,0) is mapped to a phase .pi., and two digital value (1,1) is mapped to a phase 3.pi./2. The BPSK modulation scheme may be called as two phases shift keying modulation and the QPSK modulation may be called four phases shift keying modulation. The QPSK modulated signal can carry information two times greater than information carried by the BPSK in a same frequency band. Therefore, the QPSK modulation scheme is widely used to transmit a voice signal in a satellite broadcasting system or a satellite communication system.

Furthermore, a 8PSK modulation scheme and a 16PSK modulation scheme were also widely known. The 8PSK modulated signal may carry 3 times greater information than the BPSK modulation scheme, and the 16PSK modulated signal may carry 4 times greater information than the BPSK modulation scheme.

Since a conventional satellite broadcasting system employing a digital video broadcasting via satellite (DVB-S) standard uses the QPSK modulation scheme to transmit a signal, the conventional satellite broadcasting system transmits a less amount of data than a possible amount of transmitting data when the condition of a channel is good. That is, the conventional satellite broadcasting system has a low transmission efficiency due to the QPSK modulation scheme. Furthermore, the conventional satellite broadcasting system does not allow a subscriber using a conventional receiver to receive a signal transmitted based on the DVB-S2 standard.

In order to overcome the shortcomings, a DVB-S2 backward compatible (BC) mode was introduced. The BVB-S2 BC mode allows the convention receiver to receive the satellite broadcasting signal transmitted based on the DVB-S2 standard, provides a higher transmission efficiency by transmitting signals with new signals added, and allows a new subscriber having a new receiver to receive signals that cannot be received by the conventional receiver.

In order to allow the simultaneous transmission, a transmitting device employing a DVB-S2 BC mode transmits a signal by hierarchically mapping two different input signals to one constellation point. Such a transmission scheme allows adding of new signal while maximally maintaining a conventional signal pattern. A location of mapping two different signals to the one constellation point in a constellation diagram is shown in FIG. 1. It will be described in more detail with reference to FIG. 2.

FIG. 2 is a block diagram illustrating a transmitting device employing a DVB-S2 BC mode in accordance with the related art.

As shown in FIG. 2, a BC mode modulating unit of the conventional transmitting device receives signals from a DVB-S encoder 201 and a DVB-S2 encoder 202, independently. The independently-inputted signals are distinguished to a high priority (HP) stream and a low priority (LP) stream. The HP stream is directly inputted to a hierarchical mapping block 204 and the LP stream is inputted to the hierarchical mapping block 204 through a PL header inserting block 203.

The hierarchical mapping block 204 maps two input streams, HP streams and a LP stream, to a single constellation point using the method described with FIG. 1. That is, the HP streams b0 and b1 are mapped to four quadrants 101 to 104 of the constellation diagram according to a bit value thereof. The LP stream b2 is mapped to one of points 105 to 112 which are separated from a center as much as a predetermined angle in each quadrants. Such a mapped signal is transformed to a band limited signal by a pulse transform block 205 as shown in FIG. 2, and the band limited signal is transmitted through an analog modulating block 206.

FIG. 3 is a block diagram illustrating a device for extracting streams from a DVB-S2 BC mode non-uniform 8PSK modulated signal and performing a soft decision and a demodulating apparatus having the same in accordance with the related art.

Referring to FIG. 3, a signal received through a satellite antenna is transmitted to a HP stream modulating block 301 through a signal synchronizing unit. Then, a HP stream demodulating block 301 performs a soft-decision on the received signal and transmits the result of the soft-decision to a HP stream decoding block 303 and a delay responding block 302.

Then, a HP stream decoding block 303 decodes a signal according to the soft-decision result and outputs the decoded HP stream data. Herein, the decoded HP stream data has bit-values b0 and b1 shown in FIG. 1.

The decoded HP stream data outputted from the HP stream decoding block 303 is inputted to a HP stream re-encoding and re-mapping block 304 for demodulating a LP stream. Then, the HP stream re-encoding and re-mapping block 304 determines which quadrant includes the received signal by re-encoding and re-mapping the decoded HP stream data.

A log-likelihood calculating block 305 receives the information about the determined quadrant from the HP stream re-encoding and re-mapping block 304 and the soft-decision result delayed by the delay responding block 302 to calculate a soft-decision value of the LP stream. A LP stream decoding block 306 receives the calculated soft-decision value from the log-likelihood calculating block 305 and finally outputs the decoded LP stream data b2 shown in FIG. 1.

As described above, the conventional demodulating apparatus must re-encode or re-map the decoded HP stream data, and must delay the soft-decision result for the HP stream while re-encoding and re-mapping. Also, the conventional demodulating apparatus must calculate the LLR (log-likelihood ratio) that is very complicated calculation process.

SUMMARY OF THE INVENTION

It is, therefore, an object of the present invention to provide an apparatus for independently extracting a HP stream and a LP stream from a hierarchically-modulated signal, performing a soft-decision and outputting the HP stream and the LP stream to corresponding decoders, and a method thereof.

It is another object of the present invention to provide an apparatus for independently extracting two streams from hierarchically-modulated signal and performing a soft-decision, which divaricates a receiving signal configured of an I-channel signal and a Q-channel signal, independently extracts a high priority (HP) stream and a low priority (LP) stream from corresponding one of the divaricated signals, performs the soft-decision, and outputs soft-decision values to a proper decoder, in order to generate a HP stream and a LP stream without being interfered each other and without delayed while minimizing a performance degradation and a hardware complexity through using a simple calculation and characteristics of a signal limited by a modulation scheme of a transmitting side.

In accordance with an aspect of the present invention, there is provided an apparatus for independently extracting streams from a hierarchically-modulated signal and performing a soft-decision, including: a synchronizing unit for receiving a hierarchically-modulated signal configured of an I-channel signal and a Q-channel signal from an external device and performing a synchronizing process on the received signal; a divaricating unit 410 for divaricating the synchronized signal configured of the I-channel signal and the Q-channel signal from the synchronizing unit; a high priority (HP) stream extracting and soft-decision unit for extracting a HP stream from one of the divaricated signals, and performing a soft-decision; a processing unit for processing the other of the divaricated signals to allow constellation points to be distinguished; and a low priority (LP) stream extracting and soft-decision unit for extracting a LP stream from the processed signal from the processing unit and performing a soft-decision.

In accordance with an aspect of the present invention, there is also provided a method for independently extracting streams from a hierarchically-modulated signal and performing a soft-decision, including the steps of: a) receiving a hierarchically-modulated signal configured of an I-channel signal and a Q-channel signal and performing a synchronization process on the received signal; b) divaricating the synchronized signal configured of the I-channel signal and the Q-channel signal; c) extracting a HP stream from one of the divaricated signals, and performing a soft-decision; d) processing the other of the divaricated signals to allow constellation points to be distinguished; and e) extracting a LP stream from the processed signal and performing a soft-decision.

BRIEF DESCRIPTION OF THE DRAWINGS

The above and other objects and features of the present invention will become better understood with regard to the following description of the preferred embodiments given in conjunction with the accompanying drawings, in which:

FIG. 4 is a block diagram illustrating an apparatus for independently extracting streams from an non-uniform 8PSK modulated signal in a DVB-S2 BC mode and performing a soft-decision in accordance with a preferred embodiment of the present invention.

DETAILED DESCRIPTION OF THE INVENTION

Figure 1:
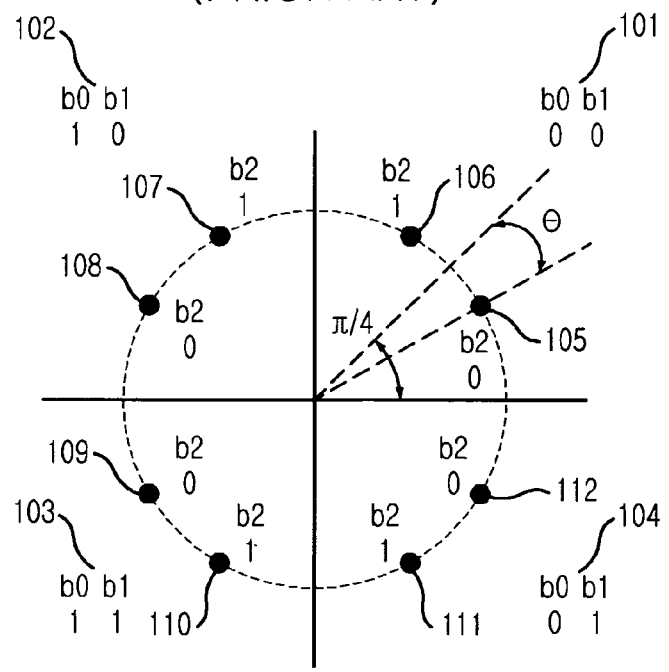
FIG. 1 is a constellation diagram of an non-uniform 8 phase shift keying (PSK) for a digital video broadcasting via satellite version 2 (DVB-S2) backward compatible (BC) mode.
Figure 2:
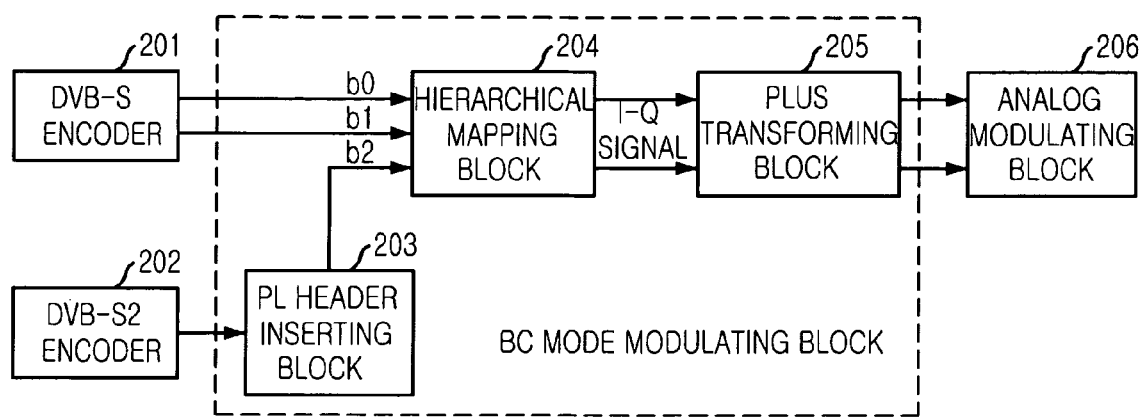
FIG. 2 is a block diagram illustrating a transmitting device employing a DVB-S2 BC mode in accordance with the related art.
Figure 3:
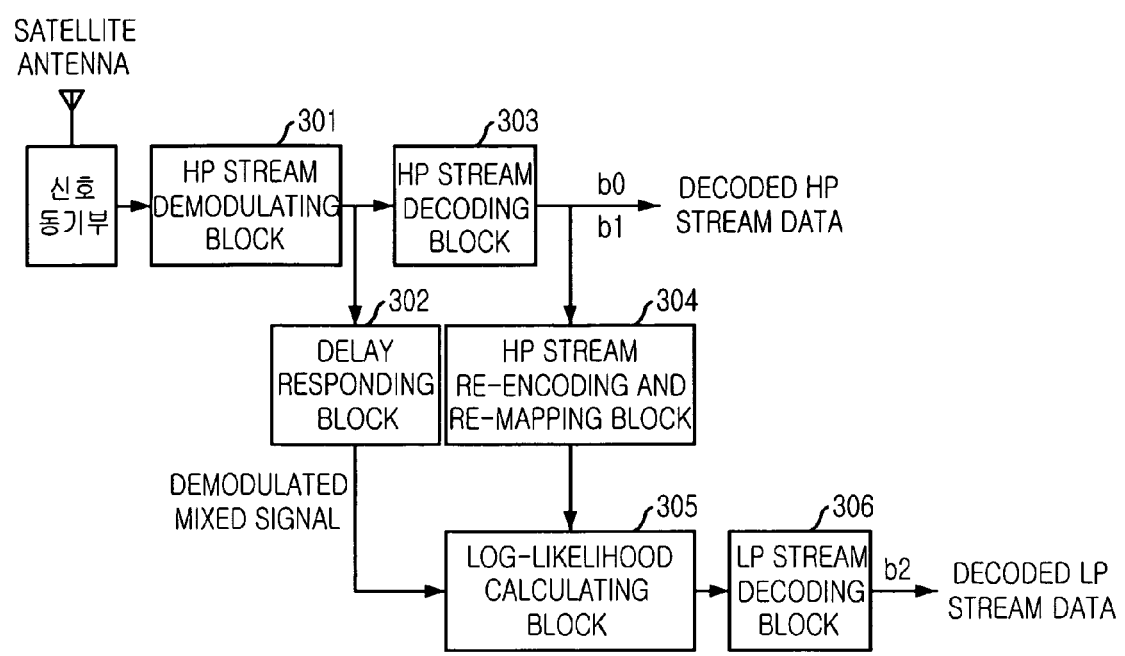
FIG. 3 is a block diagram illustrating a device for extracting streams from a DVB-S2 BC mode non-uniform 8PSK modulated signal and performing a soft decision and a modulating apparatus having the same in accordance with the related art.

Hereinafter, an apparatus for independently extracting two streams from hierarchically-modulated signal and performing a soft-decision and a method thereof in accordance with a preferred embodiment of the present invention will be described in more detail with reference to the accompanying drawings.

FIG. 4 is a block diagram illustrating an apparatus for independently extracting streams from an non-uniform 8PSK modulated signal in a DVB-S2 BC mode and performing a soft-decision in accordance with a preferred embodiment of the present invention.

Referring to FIG. 4, the apparatus for independently extracting streams from a non-uniform 8PSK modulated signal in DVB-S2 BC mode and performing a soft-decision according to the present embodiment includes:

a signal synchronizing unit 405 for receiving a DVB-S2 BC mode non-uniform 8PSK modulated signal transmitted from a transmitting side through a satellite antenna and performing a synchronizing process on the received signals; a signal divaricating unit 410 for divaricating the synchronized signal configured of an In-phase channel signal (I-channel signal) and a quadrature-phase channel signal (Q-channel signal) from the signal synchronizing unit 405; a HP stream extracting and soft-decision unit 420 for extracting a high priority (HP) stream from one of the divaricated signals configured of the I-channel signal and the Q-channel signal, performing a soft-decision based on the extracted HP stream and outputting the result of the soft-decision to a DVB-S decoder 430; a processing block 440 to 470 for processing the other of the divaricated signals configured of the I-channel signal and the Q-channel signal to allow constellation points thereof to be distinguished; and a LP stream extracting and soft-decision unit 480 for extracting a low priority (LP) stream from the received processed signal configured of the I-channel signal and the Q-channel signal, performing a soft-decision on the extracted stream and outputting the result of the soft-decision to a DVB-S2 decoder 490.

Herein, the DVB-S decoder 430 corrects an error of a signal based on the soft-decision result, which is the soft-decided HP stream data, transmitted from the HP stream extracting and soft-decision unit 420, and performing a decoding process. The DBV-S2 decoder 490 corrects an error of a signal based on the soft-decision value, which is the soft-decided LP stream data, transmitted from the LP stream extracting and soft-decision unit 480 and performs a decoding process.

The processing block includes: an absolute value calculating unit 440 for obtaining absolute values of the other of divaricated signals configured of the I-channel signal and the Q-channel signal from the signal divaricating unit 410; a trigonometric function generating unit 460 for generating a sine value and a cosine value; a multiplying unit 450 for multiplying the two absolute values from the absolute value calculating unit with the cosine value and the sine value from the trigonometric function generating unit 460 in one to one manner; and an adder 470 for adding the I channel signal and the Q channel signal which are multiplied with the cosine value and the sine value from the multiplying unit 450 and transferring the adding result to the LP stream extracting and soft-decision unit 480.

Herein, the absolute value calculating unit 440 includes a first absolute value calculator 441 for obtaining an absolute value of the I-channel signal from the signal divaricating unit 410; and a second absolute value calculator 442 for obtaining an absolute value from the other of the Q-channel signal from the signal divaricating unit 410.

The multiplying unit 450 includes: a first multiplier 451 for multiplying the absolute value of the I-channel signal from the absolute value calculating unit 440 to the sine value from the trigonometric function generating unit 460; and a second multiplier 452 for multiplying the absolute value of the Q-channel signal from the absolute value calculating unit 440 to the cosine value from the trigonometric function generating unit 460.

Hereinafter, detailed configuration and operations of the units will be described in detail.

At first, the satellite antenna 400 receives a DVB-S2 BC mode non-uniform 8PSK modulated signal transmitted from a transmitting side through a satellite and transfers the received 8PSK modulated signal to an demodulating block. Herein, the signal synchronizing unit 405 performs a synchronizing process of the received signal, for example, for recovering of phase, timing, and frequency. Then, the signal divaricating unit 410 divaricates the synchronized signal configured of the I-channel signal and the Q-channel signal, and transfers one of the divaricated signals to the HP stream extracting and soft-decision unit 420 and other of the divaricated signals to the processing block.

The HP stream extracting and soft-decision unit receives one of the divaricated signals configured of the I-channel signal and the Q-channel signal, extracts the HP stream from the received signal and performs a soft-decision. That is, the HP stream extracting and soft-decision unit 420 finds corresponding values stored in a first and a second Look-up table 421 and 422 according to the extracted HP stream and outputs the values to the DVB-S decoder 430. The configuration of the first and the second look-up table 421 and 422 is shown below table 1.

TABLE 1

| | Input | Output |
|---|---|---|
| 1024 | 0.9766E−3 | Random value |
| | 0.1953E−2 | . |
| | 0.2930E−2 | . |
| | ↓ | |
| | 0.9980 | |
| | 0.9990 | |
| | 1.0 | |

It assumes that the I-channel signal and the Q-channel signal are transferred in 10 bits. The HP stream extracting and soft-decision unit 420 distinguishes the I-channel signal and the Q-channel signal of the received signal according to 1024 input levels of the first and the second look-up table 421 and 422. The HP stream extracting and soft-decision unit 420 outputs a corresponding output value of the matched input level in the first and the second look-up table 421 and 422 to the DVB-S decoder 430.

Hereinafter, a fundamental principle of present invention for extracting a HP stream and performing a soft decision will be described. Generally, the DVB-S signal is transmitted through a QPSK modulation scheme according to the related standard. Therefore, the DVB-S signal is transmitted with a constellation different from that shown in FIG. 1. A conventional DVB-S receiver, which is only allowed to receive the QPSK modulated signal, assumes that a received signal is a QPSK modulated signal. Although the conventional DVB-S receiver receives a DVB-S2 BC mode signal, the conventional DVB-S receiver modulates the DVB-S2 BC mode signal using a QPSK demodulation scheme. Therefore, the HP stream extracting and soft-decision unit 420 may recognize the non-uniform 8PSK constellation points shown in FIG. 1 as the QPSK modulated signal with noises, and performs the soft-decision thereon. Although the real received signal is not the QPSK modulated signal, the HP stream extracting and soft-decision unit 420 outputs a soft-decision value b0 and b1 as like as the QPSK modulated signal shown in FIG. 1 after performing the soft-decision. The signal may be weakened and the performance may be degraded while extracting and performing the soft-decision, but those are ignored. According to the described a process, the HP stream is extracted from the signal configured of the HP stream and the LP stream and a soft-decision is performed in the present invention.

Meanwhile, the other of the divaricated signals is transmitted to the processing block to extract the LP stream and to perform the soft-decision at the same time with extracting the HP stream and performing the soft-decision thereon. That is, the LP stream is extracted and the soft-decision is performed as follows. As shown in FIG. 4, the satellite antenna 400 receives the DVB-S2 BC mode non-uniform 8PSK modulated signal transmitted from a transmitting side through a satellite and transfers the received 8PSK modulated signal to the demodulating block. Herein, the signal synchronizing unit 405 performs a synchronizing process on the received signal, for example, for recovering phase, timing and frequency. Then, the received signal configured of the I-channel signal and the Q-channel signal is divaricated by the divaricating unit 410 to two same signals and transmits the two divaricated signals to the HP stream extracting and soft-decision unit 420 and the processing block for extracting the LP stream and performing the soft-decision thereon.

The I-channel signal and the Q-channel signal of the other of the divaricated signals are transmitted to the first and the second absolute value calculator 441 and 442, respectively.

The first absolute value calculator 441 receives the I-channel signal and obtains the absolute value of the I-channel signal, and the second absolute value calculator 442 receives the Q-channel signal and obtains the absolute value of the Q-channel signal. That is, such a process transforms all of the received signals to have constellation points only in the first quadrant I shown in FIG. 1. Then, the first multiplier 451 multiplies a cos(π/4) to the Q-channel signal of the transformed signal, and the second multiplier 452 multiplies a sine (π/4) to the I-channel signal. Herein, the cosine value and the sine value are provided from the trigonometric function generating unit 460. The adder 470 adds the I-channel signal and the Q-channel signal which are multiplied with the cosine and the sine value. Such processes transforms the synchronized signal outputted from the synchronization unit 405 to have two constellation points of the Q-channel element in the first quadrant to be distinguished by the horizontal axis shown in FIG. 1. That is, one of the two constellation points will be located above the horizontal axis and the other of the two constellation points will be located below the horizontal axis as shown in FIG. 1.

The added signal is inputted to the LP stream extracting and soft-decision unit 480, and the LP stream extracting and soft-decision unit 480 distinguishes the added signal according to the input levels of the third look-up table 481 to find a matched output value stored in the third look-up table. The matched output value is outputted to the DVB-S2 decoder 490. Since the operation of outputting the soft-decision value from the third look up table 481 is identical that of the first and the second look up tables, the detail description is omitted.

Hereinafter, a fundamental principle of present invention for extracting a LP stream and performing a soft decision will be described. The DVB-S2 BC mode signal is transmitted through a non-uniform 8PSK modulation scheme. That is, the non-uniform 8PSK modulation scheme is used to insert one bit of LP stream signal to each symbol while maintaining transmission of the conventional DVB-S signal through the QPSK modulation scheme. Since the LP stream has a comparatively-strong encoding function, it may be recovered to an original signal although the LP stream is weak compared to the HP stream. Therefore, the LP stream may be distinguished although the characteristics of the QPSK are maintained by separating the QPSK constellation points to the right and the left at a predetermined angle. That is, the LP stream has the constellation shown in FIG. 1. Therefore, the soft-decision for the LP stream may be performed by distinguishing two constellation points inside each of the quadrants between the non-uniform 8PSK constellations shown in FIG. 1. If it is possible to determine which quadrant includes the received signal through such processes, the distinguishing of BPSK type may be possible to perform. Accordingly, the soft-decision value corresponding to the b1 bit value shown in FIG. 1 is outputted through the described processes in the present invention. The signal may be weakened and the performance may be degraded while extracting the LP stream and performing the soft-decision, but those are ignored. According to the described a process, the LP stream is extracted from the signal configured of the HP stream and the LP stream and a soft-decision is performed in the present invention.

As described above, the present invention independently extracts the HP stream and the LP stream from the modulated signal and calculates the high-reliable soft-decision value through a simple calculation process and a simple comparing decision process without performing the re-encoding process, the re-mapping process or the complicated LLR calculation process.

Also, the present invention can be embodied as a simple circuit because it is not requires a supplementary circuit for estimating a signal-to-noise ratio (SNR) that is used for the complicated LLR calculation.

Furthermore, the present invention may outputs the HP stream and the LP stream without interfering one another and without delaying because the present invention allows the HP stream and the LP stream to be extracted independently.

The present application contains subject matter related to Korean patent application No. KR 2005-0106042, filed in the Korean patent office on Nov. 07, 2005, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. An apparatus for independently extracting streams from a hierarchically-modulated signal and performing a soft-decision, comprising:
    a synchronizing means for receiving the hierarchically-modulated signal configured of an I-channel signal and a Q-channel signal from an external device and performing a synchronizing process on the received signal;
    a divaricating unit for divaricating the synchronized signal configured of the I-channel signal and the Q-channel signal from the synchronizing means;
    a high priority (HP) stream extracting and soft-decision means for extracting a HP stream from one of the divaricated signals, and performing a first soft-decision;
    a processing means for processing the other of the divaricated signals to allow constellation points to be distinguished; and
    a low priority (LP) stream extracting and soft-decision means for extracting a LP stream from the processed signal from the processing means and performing a second soft-decision;
    wherein the processing means comprising:
    an absolute value calculating unit for obtaining absolute values of the I-channel signal and the Q-channel signal in the other of the divaricated signals;
    a trigonometric function generating unit for generating a sine value and a cosine value;
    a multiplying unit for multiplying the two absolute values from the absolute value calculating unit with the cosine value and the sine value from the trigonometric function generating unit in a one to one manner; and
    an adder for adding the I-channel signal and the Q-channel signal which are multiplied with the cosine value and the sine value from the multiplying unit and transferring the adding result to the LP stream extracting and soft-decision means.

2. The apparatus as recited in claim 1, wherein the multiplying unit includes:
    a first multiplier for multiplying the absolute value of the I-channel signal from the absolute value calculating unit to the sine value from the trigonometric function generating unit; and
    a second multiplier for multiplying the absolute value of the Q-channel signal from the absolute value calculating unit to the cosine value from the trigonometric function generating unit.

3. A method for independently extracting streams from a hierarchically-modulated signal and performing a soft-decision, comprising:

receiving the hierarchically-modulated signal configured of an I-channel signal and a Q-channel signal and performing synchronization process on the received signal;

divaricating the synchronized signal configured of the I-channel signal and the Q-channel signal;

extracting a HP stream from one of the divaricated signals, and performing a first soft-decision;

processing the other of the divaricated signals to generate a processed signal to allow constellation points to be distinguished; and extracting a LP stream from the processed signal and performing a second soft-decision, wherein the processing the other of the divaricated signals further comprises:

obtaining a first absolute value for the I-channel signal and a second absolute value for the Q-channel signal;

generating a sine value and a cosine value;

multiplying the first absolute value and the second absolute value with the sine value and the cosine value in a one to one manner; and adding the multiplied values.

4. The method as recited in claim 3, wherein the hierarchical-modulated signal is a backward compatible (BC) mode signal of a digital video broadcasting via satellite version 2 standard (DVB-S2).

5. The method as recited in claim 3, wherein the step of multiplying the first absolute value and the second absolute value, the first absolute value is multiplied by the sine value, and the second absolute value is multiplied by the cosine value.

* * * * *